Oct. 2, 1945.                H. W. WILD                2,386,171
                            TERMINAL POST
                          Filed Nov. 10, 1943

INVENTOR
Henry W. Wild.
BY H. F. Johnston
ATTORNEY

Patented Oct. 2, 1945

2,386,171

UNITED STATES PATENT OFFICE 2,386,171

TERMINAL POST

Henry W. Wild, Waterbury, Conn., assignor to Scovill Manufacturing Company, Waterbury, Conn., a corporation of Connecticut Application November 10, 1943, Serial No. 509,943

9 Claims. (Cl. 173—324)

This invention relates to improvements in terminal posts to which electrical connections may be conveniently soldered.

The principal object of this invention is to provide a soldering terminal post made of sheet metal and drawn into a tubular shape such as can be quickly, economically and conveniently made in eyelet machines on a large production basis.

Heretofore, soldering posts of this character have been made as screw-machine products from rod stock. It is well known in the manufacture of articles of this character that the production of such articles on screw-machines is relatively slow as compared to eyelet machine, the waste of material is excessively high and the cost of manufacture is considerably greater.

It is, therefore, one of the prime objects of this invention to improve the construction of terminal posts by resorting to eyelet constructions and eliminating the necessity of screw-machine made parts. By the use of eyelets to fabricate the device the same can be manufactured at a high rate of speed with less waste of metal and a much reduced cost of manufacture.

Another object of this invention is to provide a terminal soldering post made from two assembled eyelets and having provision for recesses or grooves for the reception of wire connectors that may be permanently soldered there in place.

A still further object of this invention is to so construct the soldering post of two eyelets such that the attaching shank of the post may be conveniently varied in length to accommodate various thicknesses of insulation material or supports to which the posts are to be subsequently attached, which change of length may be effected without any radical change of tools for producing the same.

Other objects will appear in more detail from the following disclosure.

In the drawing.

Like parts are identified by the same reference characters throughout the several views.

Figure 1:
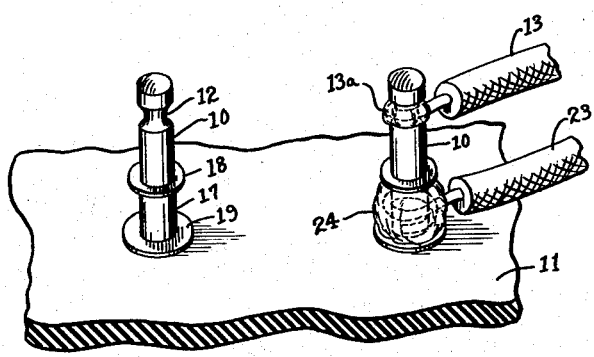
Fig. 1 is a perspective view showing two terminal posts as they appear attached to a portion of a supporting insulation member and showing a pair of electrical conductors attached to one of the post members.

The numeral 10 indicates generally the post member made from a tubular drawn shell such as can be economically made on an eyelet machine, and designed to be permanently attached to a suitable piece of insulation material 11 with its axis perpendicular to the face of said material. Adjacent the upper end of the post there is provided a circumferential recess 12 around which the bare wire of an electrical conductor 13 may be wound and soldered permanently in place by a ring of solder 13a in a manner as shown in Fig. 1. From an intermediate part of the post member 10 a reduced tubular section or shank 14 is provided which initially extends uniformly through to the open end of said member as indicated by dotted outline 15 (Fig. 2) and joined into the main body of the post by a shoulder 16.

Figure 2:
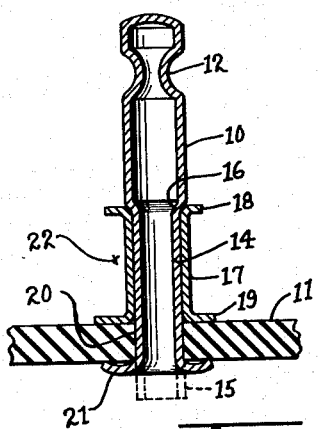
Fig. 2 is a vertical sectional view through a post member such as shown in Fig. 1 and on a somewhat larger scale.

In order to position the post in a definite height relationship to the supporting material 11 a spacing eyelet 17 is provided also drawn from thin sheet metal and produced in an eyelet machine. The spacing eyelet 17 is provided with end flanges 18 and 19 which for convenience sake are designated as the abutment flange 18 and the pedestal flange 19. The abutment flange 18, as shown in Fig. 2 being somewhat smaller of the two flanges, is abutted against the shoulder 16 of the post member 10 and the pedestal flange 19 is seated against the adjacent face of the insulation material 11. The spacing eyelet 17 is preferably so dimensioned in its interior diameter relative to the outside diameter of the post shank 14 that it will require a forced or drive fit in telescopically assembling the eyelet 17 over said shank 14 so that the post and eyelet become a single integral unit for convenience in handling and shipping of the same prior to the assembly of the soldering post member to its support of insulation material.

In assembling the post member to the insulation material 11 in case the latter is of a relatively hard substance, an opening 20 in the material 11 should be provided of a size through which the tubular shank 14 may be inserted and the post 10 properly set by reason of the pedestal flange 19 of the eyelet 17 resting against one face of the material 11. Permanent assembly is effected by having the end 15 of the shank 14 flanged outwardly or spun over as at 21 against the opposite face of the insulation material. Another conductor 23 may have its exposed wire wound about the body of the spacing eyelet 17 and soldered permanently in place as by solder 24 as shown in Fig. 1. The flanges 18 and 19 of the eyelet 17 being outwardly formed thus provide for a circumferential recess 22 within which wire of the conductor may be confined for purposes of soldering and, if the need requires, more than one wire may be secured to this position of the post.

It should be understood that these electrical terminal posts to which electrical conductors are soldered are much smaller in size than is shown in the illustrations of the drawing, and the principal object of having the recesses 12 an 22 is to hold the conductor wire in position upon the post without slipping off for the purpose of assisting the operator or electrician in permitting him to use both his hands in making the soldered connection.

Figure 3:
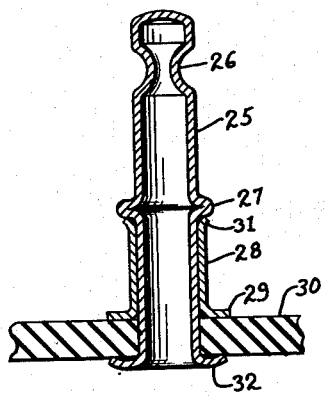
Fig. 3 is a similar view of a slightly modified construction.

Fig. 3 shows a slightly modified form of construction wherein the post member 25 of tubular eyelet construction is of uniform diameter throughout its entire length and having a circumferential recess 26 adjacent its upper end. Instead of a shoulder at its intermediate portion the post 25 in this exemplification is provided with an outwardly formed intermediate bead 27. A spacing eyelet 28 is also provided having a base flange 29 at one end adapted to seat against the adjacent face of an insulation block 30, and the opposite end of the eyelet is slightly flared or bellmouthed as at 31 for the purpose of guiding the eyelet 28 over the end of the post member 25 in the act of assembling of the same. The eyelet 28 similar to the eyelet 17 of the first form is fitted upon the tubular post 25 as by a forced fit and is telescopically forced thereover until the flared portion 31 abuts against the adjacent face of the bead 27 as a stop. When assembling the device to the insulation material 30 in the usual manner, the outer end of the tubular post 25 may be upset or flanged outwardly as at 32 against the opposite face of the insulation material for permanent anchorage. The space between the flange 29 and the bead 27 provides for a circumferential recess similar to the recess 22 of the first form and serves to confine one or more electrical conductors wrapped about the body of the eyelet 28 and hold them in position coincident with the soldering operation.

Figure 4:
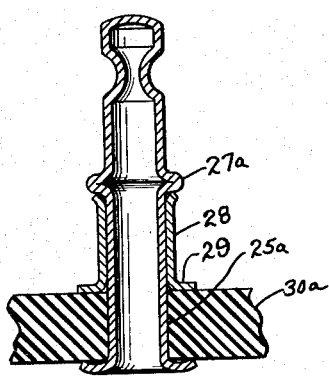
Fig. 4 shows how the form of Fig. 3 might be varied to accommodate different thicknesses of the insulating supporting material which, specifically in this figure, is shown to be somewhat thicker than that shown in Fig. 3.

Fig. 4 shows a construction identical to Fig. 3 except illustrating how the bead 27a may be axially shifted in its position relative to the length of the post 25 so that a somewhat longer shank 25a below the flange 29 of the eyelet 28 will be provided to accommodate a thicker piece of insulation material 30a than is shown in Fig. 3 to which the post member may be secured. Obviously the post can be manufactured to accommodate an enumerable number of different thicknesses of insulation material merely by changing the axial position of the bead 27a relative to one end of the post and without requiring a different amount of material for the manufacture of the post or any radical change of the tools in the manufacture of the same.

Another advantage of the invention resides in the fact that a sheet metal eyelet construction is considerably stronger than a similar device made as a screw-machine product and particularly as it relates to any subsequent forming operation that may be required to secure the post to its final support material.

While I have herein described and upon the drawing shown several illustrative embodiments of the invention, it is to be understood that the invention is not limited thereto, but may comprehend other structural arrangements and details of parts without departing from the spirit of the invention and coming within the scope of the appended claims.

I claim:

1. A terminal post to which conductor wires may be secured comprising a hollow tubular part having one end closed and the opposite end open and provided with an intermediate shoulder, and a tubular spacer eyelet fitted over said part with one end abuted against said shoulder as a stop, the opposite end of said eyelet having a flange adapted to seat against the adjacent face of a support member to which the post may be attached, said eyelet serving to position the shoulder of said tubular part in spaced relation to said support member, and said tubular part shoulder and said eyelet flange defining a cirferential recess about said post in which the terminal end of a conductor may be coiled for holding purposes.

2. A terminal post to which conductor wires may be secured comprising a hollow tubular shell having one end closed and the other end open and provided with an intermediate shoulder, and a tubular spacer eyelet designed to be fitted over said shell by a drive fit with one end of said eyelet abutted against said shoulder as a stop and the opposite end having a flange adapted to seat against the adjacent face of a support member to which the post may be attached said eyelet serving to position the shoulder of said shell in spaced relation to said support member, and means for permanently anchoring the open end of said shell to said support, said shell shoulder and eyelet flange defining a circumferential recess about said post in which the terminal end of a conductor wire may be coiled for holding purposes.

3. A terminal post to which conductor wires may be secured comprising a hollow tubular member of a drawn metal shell closed at one end and open at the opposite end and provided with an intermediate shoulder, and a sheet metal spacer eyelet having outwardly formed flanges at its opposite ends, said eyelet fitted over said tubular member with one flange abutted against said shoulder as a stop and the opposite flange removed from the end of said tubular member and serving as a pedestal to seat against the adjacent face of a support member to which said post may be attached said eyelet flanges also serving to define a circumferential recess about said post in which the terminal end of a conductor wire may be coiled for holding purposes, the length of said tubular member extending beyond said eyelet pedestal flange being sufficient to pass through an opening in said support member and having a portion formed over against the adjacent face of said material in opposition to said pedestal flange for purposes of permanently anchoring said post to said member.

4. A terminal post to which conductor wires may be secured comprising a hollow tubular shell closed at one end and open at the opposite end and provided with an intermediate shoulder and a circumferential recess adjacent its closed end, and a tubular eyelet member fitted over said shell and having a flared end abutted against said shoulder as a stop, the opposite end of said eyelet having a pedestal flange adapted to rest upon the surface of a support member to which the eyelet is attached, said eyelet flange and said shell shoulder defining a second circumferential recess about said post within which recesses the terminal ends of conductor wires may be coiled for temporary holding purposes preliminary to a soldering operation.

5. A terminal post comprising a hollow tubular shell closed at one end and open at the opposite end and provided with an intermediate shoulder and a circumferential recess adjacent its closed end, and an eyelet member formed with flanges at its opposite ends fitted over said tubular shell from its open end with one flange abutted against said shoulder as a stop and the other flange adapted to rest against the adjacent face of a support member to which the post may be attached, the flanges of said eyelet defining with the body of said eyelet another circumferential recess, said recesses serving to receive one or more wound coils of conductor wire to hold said wires preliminary to a soldering operation.

6. A terminal post to which conductor wires may be secured comprising a hollow tubular shell of two diameters with a joining shoulder, the larger portion of said shell having a closed end and a circumferential recess adjacent its closed end and the smaller portion having an open end constituting the attaching shank of said shell, and a tubular eyelet having end flanges adapted to be fitted over said shank with one flange abutted against said shoulder as a stop and the opposite flange removed from the end of said shank and serving as a pedestal against the adjacent face of a support member to which said post may be attached, said eyelet flanges defining a second circumferential recess about said post within which recesses the terminal ends of conductor wires may be coiled for temporary holding purposes preliminary to a soldering operation.

7. A terminal post to which conductor wires may be secured comprising a hollow tubular shell having a closed end and an open end and a circumferential recess adjacent its closed end, said shell also having an outwardly formed bead flange at its intermediate portion, and a hollow shell eyelet having one end slightly flared for fitting over the open end of said shell and abutted against said bead flange as a stop and serving as a means to space the shell bead flange from a support member to which said terminal post may be attached, the opposite end of said eyelet formed with a pedestal flange adapted to rest against the adjacent face of said support member, said shell bead flange and said eyelet flange defining a second circumferential recess about said post and within which recesses the terminal ends of conductor wires may be coiled for holding purposes.

8. A terminal post to which conductor wires may be secured comprising a hollow tubular shell having a closed end and an open end and a circumferential recess adjacent its closed end, said shell also having an outwardly formed bead flange at its intermediate portion, and a hollow shell eyelet having one end abutted against said bead flange as a stop and serving as a means to space the shell bead flange from a support member to which said terminal post may be attached, the opposite end of said eyelet provided with an outwardly formed flange adapted to rest against the adjacent face of said support member, said shell bead flange and said eyelet flange defining a second circumferential recess about said post and within which recesses the terminal ends of conductor wires may be coiled for holding purposes.

9. A terminal post to which conductor wires may be secured comprising a hollow tubular shell having a closed end and an open end and provided with an intermediate shoulder, and a tubular eyelet fitted over said shell from the open end of said shell and having one end abutted against said shoulder as a stop and the opposite end provided with a radial flange spaced from the open end of said shell, that portion of said shell extending beyond said flange adapted to be inserted through a support member and having its end flanged over against the adjacent surface of said member with the radial flange of said eyelet embracing the opposite surface of said member as a means of permanently securing said post to said support member, said eyelet flange and said shell shoulder defining a circumferential recess about said post adapted to receive the terminal end of a conductor wire for anchorage purposes.

HENRY W. WILD.